United States Patent [19]

Casolo

[11] 4,182,676

[45] * Jan. 8, 1980

[54] METHOD AND SYSTEM FOR PURIFYING LIQUID

[75] Inventor: Angelo J. Casolo, Columbia, Md.

[73] Assignee: Almag Chemical Corp., Baltimore, Md.

[*] Notice: The portion of the term of this patent subsequent to Oct. 12, 1993, has been disclaimed.

[21] Appl. No.: 711,363

[22] Filed: Aug. 3, 1976

Related U.S. Application Data

[62] Division of Ser. No. 483,801, Jun. 27, 1974, Pat. No. 3,985,648.

[51] Int. Cl.$^2$ .................... C02B 1/42; C02B 1/56
[52] U.S. Cl. .................... 210/27; 210/37 R; 210/38 B; 210/40
[58] Field of Search .................... 210/27, 37, 38, 39, 210/40, 73

[56] References Cited

U.S. PATENT DOCUMENTS

| | | | |
|---|---|---|---|
| 3,408,289 | 10/1968 | Gustafson | 210/27 |
| 3,618,589 | 11/1971 | Tavani | 210/38 A |
| 3,697,419 | 10/1972 | Grant | 210/27 |
| 3,753,899 | 8/1973 | Kunin et al. | 210/37 R |
| 3,758,405 | 9/1973 | Fremont | 210/73 R |
| 3,985,648 | 10/1976 | Casolo | 210/27 |

Primary Examiner—Charles N. Hart
Assistant Examiner—Ivars Cintins
Attorney, Agent, or Firm—Morton J. Rosenberg

[57] ABSTRACT

A method and system combining filtration and ion-exchange structures for removing contaminants from liquids. In overall concept, contaminated liquid is passed through filtering mediums to remove particulate matter from the incoming contaminated liquid. Organics are removed from the liquid by passage through adsorbent non-ionic type resins. The liquid is then passed through strong acid cation exchange resins, weak base anion exchange resins, weak acid cation exchange resins, and strong base anion exchange resins arranged in a predetermined location in the liquid flow path to provide optimized contaminant removal. One of the optimization techniques is through the pH adjustment of the liquid at predetermined points in the flow path. Additionally, the liquid to be purified is passed through mixed bed polisher resins as well as chelation resins to provide a final substantially contaminant free liquid which is returned to use in a closed loop fashion.

10 Claims, 2 Drawing Figures

METHOD AND SYSTEM FOR PURIFYING LIQUID

This is a division of application Ser. No. 483,801 filed June 27, 1974, now U.S. Pat. No. 3,985,648.

BACKGROUND OF THE INVENTION

1. Field of the Invention

This invention pertains to a system and method of purifying contaminated liquids. In particular, this invention relates to a method utilizing ion-exchange systems to purify liquid. More in particular, this invention pertains to the use of filtration media used in combination with ion-exchange systems to provide contaminant removal from liquids. Still further, this invention relates to a method where contaminated liquid is transported through ion-exchange resins of differing types in a predetermined flow path to provide optimized removal of liquid contaminants.

2. Prior Art

In some prior cases, industrial and commercial complexes which produced contaminated liquids have discharged these liquids into public waterways. This had the effect of polluting the receiving waterways and making such untenable for a wide variety of uses.

In some prior cases, filtration systems have been used to remove particulate matter from liquids containing contaminants. However, in such prior cases only particulates were removed from the contaminated liquid. Other contaminants in solution within the liquid were not removed by using this process. Thus, many types of contaminants in solution remained in the liquid after the filtration process was completed. Discharge of such partially contaminated liquid into the public waterways often times created a pollution problem and made such a health hazard.

In other prior systems and methods, ion-exchange resins have been used to provide removal of contaminants in solution. However, in some of these systems utilizing ion-exchange resins, the contaminated liquid passing through the resins is not adjusted for pH value ranges. In such methods and systems, the resins are not utilized to their fullest extent. Thus, increased quantities of resins must be used to provide a reasonable contamination removal from the liquid being processed. Such large quantities of resins necessitate the use of large structures to house the resins and such increases the cost of contaminant removal from the liquid. Additionally, where the contamination removal is not optimized, it has been found that in some areas, that the liquid contamination removal is not sufficient to purify the liquid passing therethrough and thus the liquid may not be discharged into public waterways.

In some prior systems utilizing ion-exchange resins for removal of contaminants has necessitated the use of large housing structures. Thus, in such prior systems in-place regeneration was necessarily used. However, such regeneration provided for additional equipment to be used in conjunction with such systems. This had the effect of increasing the cost of such liquid purifying systems. Such systems, due to their massive structure did not permit the removal of the structures from the ion-exchange site. Thus, in-place regeneration also has provided for increased non-operating time of such ion-exchange systems, which had the effect of increasing the liquid purifying costs.

SUMMARY OF THE INVENTION

A method of purifying contaminated liquid which includes the step of adjusting a pH value of a partially contaminated liquid to drive the pH value into a substantially neutral range. Following the adjustment of the pH value, hydrogen ions are released from the liquid to form a partially contaminated acidic liquid. The acidic liquid is transported through a strong base anion exchange resin for removal of predetermined contaminants from the acidic liquid.

DESCRIPTION OF THE PREFERRED EMBODIMENTS

Figure 1:
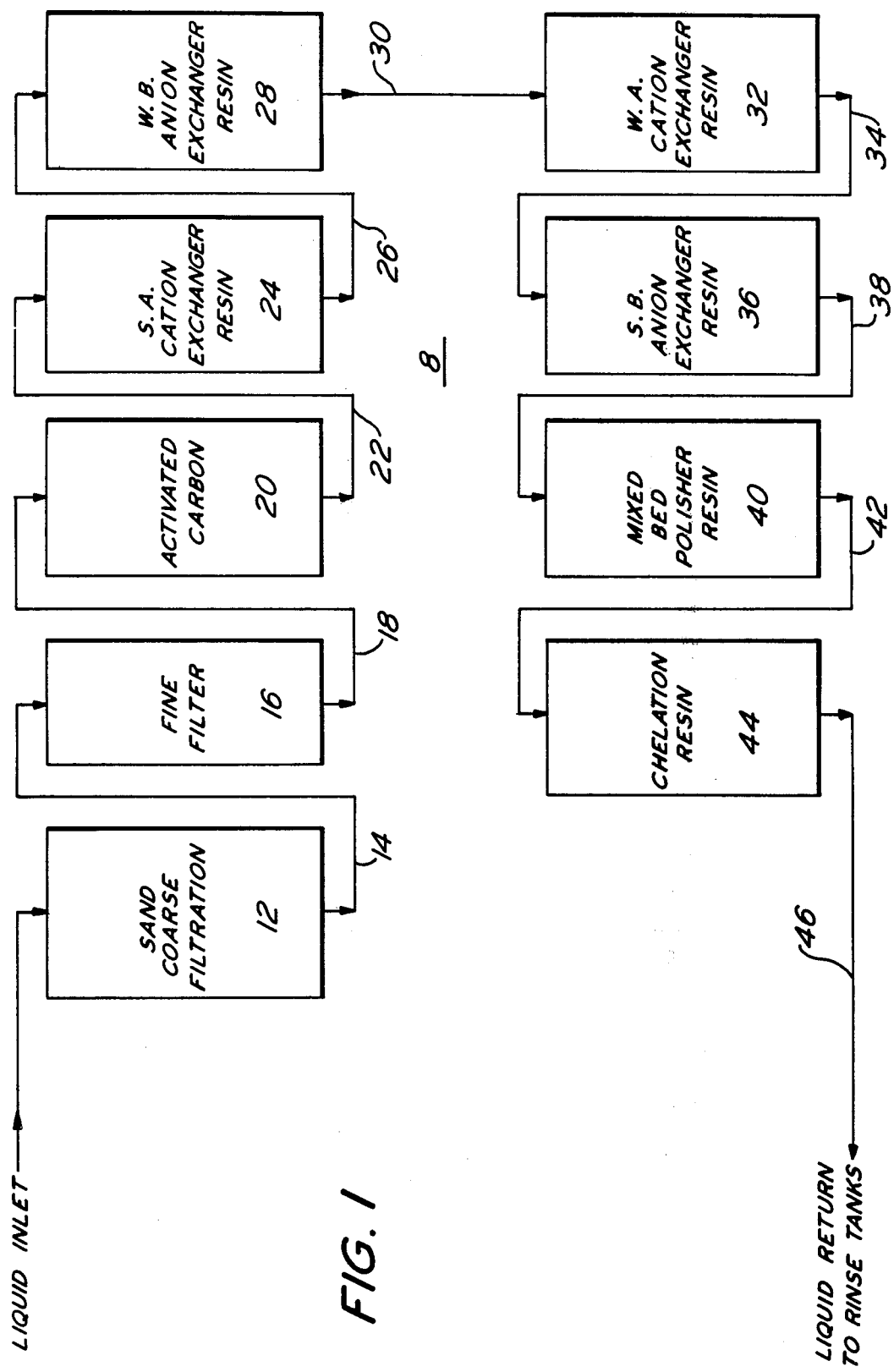
FIG. 1 is a flow block diagram showing a series flow ion-exchange system.

Referring now to the invention there is shown in FIG. 1 ion-exchange system 8 and the associated process for cleansing industrial and commercial waste liquids containing a multiplicity of contaminating constituents. The process optimizes the efficiency of ion-exchange system 8 by arranging a plurality of ion-exchange resins in a predetermined manner within the flow path of the liquid to be purified, as will be detailed in following paragraphs. Additionally, liquids being displaced through system 8 are recycled into respective rinse tanks in a closed loop manner thus reducing liquid usage. All modules or housings within which a particular resin or filtration media are housed are in the form of returnable, and replaceable structures which eliminate the problems related to in-place auto regeneration found in prior ion-exchange systems of this type. In overall concept, the invention as is herein detailed involves an optimized ion-exchange system 8 including filtration modules which permit liquids containing a multiplicity of contaminating substances to be purified and then returned to rinse tanks or other storage vessels for reuse in a closed loop manner.

For purposes of defining and clarifying the general purification process of system 8 of FIG. 1, it is to be understood that ion-exchange as is to be hereinafter referenced includes a chemical reaction where mobile hydrated ions of a solid are exchanged for ions of like charge in solution. In general, the solid or ion-exchange resin has an open cell matrix structure. The mobile ions electrically neutralize charged or potentially charged groups attached to the solid matrix. Cation exchange occurs when fixed charge groups of the matrix structure are negative and anion exchange occurs when the fixed charge groups are positive. Ion-exchange has been used commerically in a wide variety of liquid purification systems such as: water softening, water demineralization, purification of chemicals as well as in the separation of substances.

Ion-exchange system 8 as is shown in FIG. 1, describes a series flow arrangement for liquid to be purified. Contaminated liquid is initially inserted into module or container 12 through conduit 10. Module 12 incorporates and has housed therein a coarse filtration media such as sand, anthracite, or some like material to retain large particulate matter which is not in a solution in the contaminated liquid being transferred into container 12. Coarse filtration within module 12 provides for removal of particulate matter in the size range of 25.0 microns. Particular materials being used in modules to be herein detailed are shown in the Table which defines particular type of materials, commercial names, manufacturers, and the function of the material.

Contaminated liquid with relatively large sized particulate matter now having been removed exits from module 12 through conduit 14 and is inserted into an upper section of fine filtration housing 16. Housing 16 has incorporated therein a medium material such as compressed cellulose polypropylene, Dynel, or some like material. Such filters are commercially available in a variety of sizes and configurations such as in a cartridge or wafer type configuration. This filter retains fine particulates which pass through coarse filtration module 12 and essentially allow only those contaminating materials which are in solution within the contaminated liquid to pass to the next module. Particulate sizes down to approximately 2.0 microns are captured by the media contained within module 16. Thus, filtration steps as hereinbefore detailed provide for the transporting of contaminated liquid through a coarse filtration medium contained within module 12 for removing relatively large size particulate matter from the contaminated liquid. The second step of the filtration process is to then pass the contaminated liquid through a fine filtration medium contained within housing 16 for removing fine particulates from the contaminated liquid.

Liquid leaving module 16 passes through conduit 18 into housing 20 containing an adsorbent type material such as activated carbon or other adsorbent non-ionic type resins, well known in the art. The adsorbent material maintained within housing 20 removes organic materials from the contaminated liquid which can foul up the ion-exchange resin if such organics were allowed to pass into contact with the resins. Thus, organic type contaminants as well as organic type dyes such as those utilized in plating and printing processes are adsorbed on the adsorbent resin or material contained in housing or module 20 prior to the contaminated liquid engaging ion exchange resins within ion-exchange system 8. Liquid colour may also possibly be removed within housing structure 20, where that is a contaminating factor.

Contaminated liquid transported through conduit 22 now enters strong acid cation exchange resin housing 24. The resin contained within housing 24 may be in a hydrogen or a sodium form. For most commercial and industrial needs the resin would be in a hydrogen form (H+condition) which would allow the resin to act as a cation exchange material specifically utilized and directed toward multivalent type cations (monovalent and some divalent cations). Various resin materials commonly used in strong acid cation exchange housing 24 are clearly seen in the Table. Examples of some contaminating constituents removed in this step include sodiums, chromium +3, silver, cadmium, gold, etc. The liquid existing from housing 24 has a pH value less than 7.0 and substantially within the approximate pH range 1.0–5.0.

The partially contaminated liquid now emitted from module 24, passes through conduit 26 and enters weak base anion exchange resin module 28 as is shown in FIG. 1. Housing 28 includes a weak base anion exchange resin which basically serves as a pH neutralizer when it is placed in series flow combination with a strong acid cation exchange resin material such as that housed within container 24. It will be noted that the liquid after passing through the resin within module 24 becomes acidic. The acidic partially contaminated liquid passing through the resin contained within module 28 has its pH value adjusted in a manner such that it approaches the neutral pH range. Thus, liquid flowing through module 28 emits hydroxals which elevates the pH value of the liquid and generally moves it into the pH neutral region. The liquid egressing from housing 28 has a pH value slightly greater than 7.0 and may be within the approximate range of 7.0–10.0. Additionally, the resin in housing 28 removes constituents such as nitrates, sulfates, phosphates, etc.

The liquid being purified now passes through conduit 30 into module 32 containing a weak acid cation exchange resin. Adjustment of the pH value of the liquid within weak base anion exchange housing 28 provides for increased efficiency of the weak acid cation exchange resin within module 32 for removal of multivalents such as aluminum, calcium, magnesium, zinc, lead as well as other multivalent constituents. The passage of the liquid through the weak acid cation exchange or resin provides for the release of hydrogen ions from the pH value adjusted liquid and forms a partially contaminated acidic liquid passing out from module 32 through conduit 34 having a pH adjustment value within the approximate range 3.0–7.0. Thus, the pH value of the liquid is readjusted and essentially depressed to enter into the acidic region as it passes through module 32.

Liquid passing from module 32 through conduit 34 enters a strong base anion exchange resin housing 36 which is highly receptive to the now slightly adjusted acidic liquid passing therethrough. The strong base anion exchange resin within container 36 removes contaminants such as hexavalent chromium, cyanide, carbonates, and cyanide metal complexes. By providing a slightly acidic liquid to pass through the resin contained in housing 36, the resin contained therein is formed into a high efficient system for the removal of the aforementioned contaminants.

The strong base anion exchange resin contained within module 36 is generally in the hydroxal form. In its passage through the resin within module 36 the solution pH becomes elevated into a slightly basic region generally ranging between 7.0–10.0. The now slightly basic liquid passes through conduit 38 into mixed polisher resin housing 40. The resin contained within the housing 40 is generally a mixture of both anionic and cationic materials preferably being 50% by volume of each type of resin mixed together and housed within container 40. Residual contamination passing through the other resin cartridges 24, 28, 32 and 36 are picked out of the solution. The liquid passing from container 40 within conduit 42 is essentially deionized after its passage through module 40. Thus providing for a final pH stabilization of the liquid into a pH value approximating 7.0.

Liquid passing through conduit 42 then enters chelation resin module 44 which includes chelation type resin. The function of this specific resin is to remove metal ions which maintain a +2 or +3 valance number such as copper, iron, nickle, gold, silver, as well as other like metals. The liquid passing from housing 44 through conduit 46 is now essentially purified and is returned to rinse tanks.

The following Table provides for the various types of materials used in the modules as herein described. The Table provides for various media which have been successfully used in the process steps of the invention as herein described:

TABLE

| TYPE MATERIAL | COMMERCIAL NAME | MANUFACTURER/VENDOR | FUNCTION |
| --- | --- | --- | --- |
| SAND | ANTHRACITE | CULLIGAN CORP. | course filtration |
| CARBON | CULCITE | BRUNNER CORP. | adsorbent, organic and color |
| ANION EXCHANGERS | MSA-1 | DOW CHEMICAL CORP. | strong base exchanger |
| | IRA-900 | ROHM AND HAAS CO. | " |
| | IRA-938 | ROHM AND HAAS CO. | " |
| | IRA-400 | ROHM AND HAAS CO. | " |
| | A-101 | DIAMOND CHEMICAL CO. | " |
| | A-161 | DIAMOND CHEMICAL CO. | " |
| | ES-308 | DIAMOND CHEMICAL CO. | weak base exchanger |
| | ES-340 | DIAMOND CHEMICAL CO. | " |
| | IRA-93 | ROHM AND HAAS CO. | " |
| | MWA-1 | DOW CHEMICAL CO. | " |
| CATION EXCHANGERS | MSC-1 | DOW CHEMICAL CO. | strong acid exchanger |
| | A-200 | ROHM AND HAAS CO. | " |
| | IRA-400 | ROHM AND HAAS CO. | " |
| | C-20 | DIAMOND CHEMICAL CO. | " |
| | ES-26 | DIAMOND CHEMICAL CO. | " |
| | CC-3 | DIAMOND CHEMICAL CO. | weak acid exchanger |
| | IRC-50 | ROHM AND HAAS CO. | " |
| | IRC-84 | ROHM AND HAAS CO. | " |
| CHELATION | XE-318 | ROHM AND HAAS CO. | metals |
| | A-1 | DOW CHEMICAL CORP. | " |
| MIXED BED | MB-1 | ROHM AND HAAS CO. | deionization, polishing |
| | GPD-1 | DIAMOND CHEMICAL CO. | " |

Figure 2:
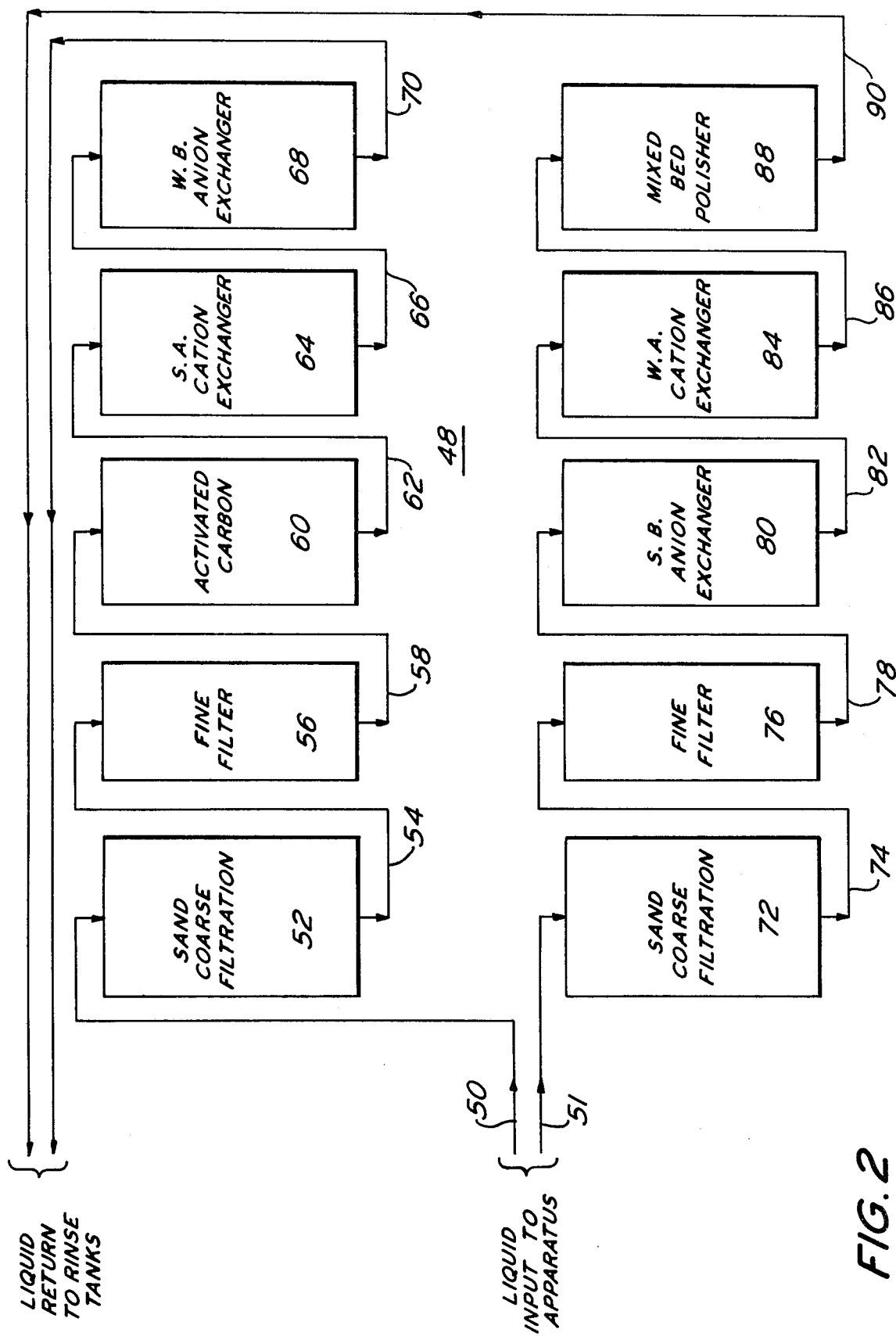
FIG. 2 is a flow block diagram showing a series-parallel liquid flow ion-exchange liquid purification system.

A series-parallel flow ion-exchange system 48 utilizing the concepts of the present invention is shown in FIG. 2. In this type of series-parallel flow system 48, contaminated liquid is broken or divided into two streams which are passed through first stream conduit 50 and second stream conduit 51. Each of the first and second streams are transported to respective modules 52 and 72 which include a coarse filtration medium such as sand, anthracite, or some like material. As was the case in module 12 shown in FIG. 1, relatively large size particulate matter down to 25.0 microns are removed in modules 52 and 72 from the contaminated liquid being input thereto. Finer particulate matter is then removed from first and second streams when the liquid is transported by conduits 54 and 74 respectively through fine filter modules 56 and 76 which contain a fine filter medium such as that described for the fine filter medium contained within module 16 of FIG. 1.

Referring now to the series flow of the first stream after it passes through fine filter housing 56, it is seen that the first stream passes through piping or conduit 58 into activated carbon module 60. Module 60 contains activated carbon or some adsorbent non-ionic type resin to remove organic material. The first stream then is transported through conduit 62 into strong acid cation exchange resin module 64 which is generally geared toward multivalent type cations. The liquid passing through strong acid cation exchange housing 64 generally becomes acidic in nature and is passed through conduit 66 into weak base anion exchange container 68 where the pH value is adjusted and directed into the neutral pH range. The first stream then exits from housing 68 through conduit 70 and is returned to the rinse tanks to be recombined with the second stream purified liquid as will be discussed in the following paragraphs.

During the time that the first stream is being passed through modules 60, 64, and 68, the second stream after passing through fine filter module 76, enters strong base anion exchange housing 80 through conduit 78. The strong base anion exchange resin within module 80 removes or takes up unwanted contaminants in the particulate devoid liquid such as hexavalent chromium cyanide, carbonates, and cyanide metal complexes, as was explained in the description of module 36 shown in FIG. 1.

The second stream liquid then passes through conduit 82 into weak acid cation exchanger housing 84 where the pH value of the incoming liquid is depressed and enters the acidic region. Liquid then flows through conduit 86 and enters mixed bed polisher structure 88 similar in nature to the mixed bed polisher resin housing 40 of FIG. 1. The now purified liquid passes through conduit 90 and is returned to the rinse tank where it is combined with the purified liquid passing from conduit 70 as has been previously discussed.

It will be understood by those versed in the art, that the parallel arrangement of system 48 allows passage of two streams of liquid in one time domain. One of the streams passes into a stong acid cation exchange resin structure 64 followed in series flow through a weak base anion base structure 68 whereas on the opposing path of a second stream there is provided a strong base anion exchange resin within housing 80 followed in series flow by a weak acidic cation exchange resin in housing 84. Thus the continuous or cycle passage of the liquid being used in system 48 shows in one time domain the liquid passing from a strong acid cation resin to a weak base anion resin whereas in another time domain another mixture would pass between a strong base anion resin to a weak acid cation resin. In such a manner, the pH value of the liquid is adjusted into optimum ranges to provide for maximum removal of contaminants found in the liquid similar to the pH adjustment through the analogous resin housings of system 8 in FIG. 1.

It will be understood that various arrangements of the resins may be changed and added such as the passage of the partially purified liquid through polishers and chelation resins prior to recycling into the rinse tanks without removing the process from the spirit and scope of the invention as is herein detailed.

As will be well understood to one versed in the art, the adjustment of pH liquid values and liquid purification is dependent on a number of parameters. For the invention as herein described, empirical adjustment of the housing volumes has been made as a function of the contaminants found in the liquid to be purified. The following Table presents a series of on-line water purifying systems utilizing the concept of the instant invention:

TABLE

| EX. # | CONTAMINATING CONSTITUENTS | RINSE TANK CAPACITY | HOUSINGS SIZE | HOUSINGS QUANTITY |
|---|---|---|---|---|
| 1 | nitrate, phosphate, sulfate, cyanide, iron, copper, silver and chromium | 50 gal. | 6" × 42" | 6-resin and 2 filter housings (Series flow) |
| 2 | phosphate, sulfate, cyanide, manganese iron, copper, gold, nickel, tin and zinc | 125 gal. | 6" × 48" | 6-resin and 2 filter housings (Series flow) |
| 3 | cyanide, sulfate, phospate, cadmium, chromium and iron | 150 gal. | 8" × 42" | 6-resin, 1 carbon, 1 sand & 2 filter housings (Series flow) |
| 4 | sulfate, phosphate, iron, copper and chromium | 125 gal. | 3" × 42" | 5 resin, 1 carbon, 1 sand and 2 filters (Series-Parallel flow) |
| 5 | sulfate, phosphate, nitrate, manganese, iron, copper, zinc, chromium aluminum, and nickel | 500 gal. | 8" × 42" | 6 resin, 1 carbon 1 sand and 2 filters (Series flow) |
| 6 | sulfate, phosphate, cyanide, iron, copper, aluminum, nickel and chromium | 150 gal. | 8" × 42" | 5 resin, 1 carbon 1 sand and 2 filters (Series-Parallel flow) |
| 7 | sulfate, phosphate, iron copper, aluminum and chromium (Hydroxyl ions also present) | 1,500 gal. | 12" × 60" | 5 resin, 1 carbon and 2 sand (Series-Parallel flow) |
| 8 | organic dyes, sulfate, iron sulfuric acids and aluminum | 1.500 gal. | 12" × 60" | 5 resin, 1 carbon and 2 sand (Series-Parallel flow) |

Although this invention has been described in connection with specific forms and embodiments thereof, it will be appreciated that various modifications other than those discussed above may be resorted to without departing from the spirit or scope of the invention. For example, equivalent elemental structures and steps may be substituted for those specifically shown and described, certain features may be used independently of other features, and in some cases parts may be reversed, all without departing from the spirit or scope of the invention as defined in the appended claims.

What is claimed is:

1. A method of purifying mineral contaminated water, said water including mineral contaminants of copper, cadmium, chromium ($Cr^{+6}$), iron, cyanide, and phosphate, including the steps of:
  (a) dividing said mineral contaminated water from a storage tank into a first stream and a second stream;
  (b) transporting said first stream through a first plurality of ion exchange resins connected in series flow each to the other including series passage through a strong acid cation exchange resin in the hydrogen form to provide an efflux having a pH value within the range of 1.0 and 5.0, and a weak base anion exchange resin in the hydroxyl form to provide an efflux having a pH value within the range of 7.0 and 10.0,
  (c) simultaneously passing said second stream through a second plurality of ion exchange resins coupled each to the other in series flow including consecutive series flow through a strong base anion exchange resin in the hydroxyl form to provide an efflux pH value within the range of 7.0–10.0, and a weak acid cation exchange resin in the hydrogen form to provide an efflux having a pH value within the range of 3.0–7.0; and
  (d) combining liquid efflux of said first and second plurality of ion exchange resins for return to said storage tank.

2. The method of purifying contaminated liquid as recited in claim 1 including the step of transporting each of said first and second streams through a plurality of filtering mediums for removing particulates or predetermined size.

3. The method of purifying contaminated liquid as recited in claim 2 where the step of transporting each of said first and second streams includes the step of passing each of said streams through a coarse filtration medium, said coarse filtration medium being sand particles.

4. The method of purifying contaminated liquid as recited in claim 3 including the step of filtering each of said first and second streams through a fine filter medium after each of said first and second streams has passed through said coarse filter mediums, said coarse and fine filter mediums being connected in series flow.

5. The method of purifying contaminated liquid as recited in claim 1 where the step of transporting said first stream includes the step of displacing said first stream through an adsorbent medium for removing organic contaminants from said contaminated liquid.

6. The method of purifying contaminated liquid as recited in claim 5 where said adsorbent medium is activated carbon.

7. The method of purifying contaminated liquid as recited in claim 5 where the step of transporting said first stream includes the step of displacing said liquid through said strong acid cation exchange resin after said liquid has passed through said adsorbent medium.

8. The method of purifying contaminated liquid as recited in claim 1 where the step of passing said stream through said weak acid cation exchange resin is followed by the step of passing said second stream through a mixture of anionic and cationic resins, each being intermixed with the other.

9. The method of purifying contaminated liquid as recited in claim 8 where said anionic and cationic resin mixture includes approximately 50.0% by volume of said anionic resin.

10. The method of purifying contaminated liquid as recited in claim 8 where said second stream passes from said weak acid cation exchange resin to said mixture of anionic and cationic resins in series flow.

* * * * *